US012676380B2

(12) United States Patent
Shimizu et al.

(10) Patent No.: US 12,676,380 B2
(45) Date of Patent: Jul. 7, 2026

(54) BATTERY PACK

(71) Applicant: Panasonic Intellectual Property Management Co., Ltd., Osaka (JP)

(72) Inventors: Keisuke Shimizu, Osaka (JP); Yasuaki Sakagawa, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 824 days.

(21) Appl. No.: 18/040,155

(22) PCT Filed: Aug. 3, 2021

(86) PCT No.: PCT/JP2021/028694
§ 371 (c)(1),
(2) Date: Jul. 18, 2023

(87) PCT Pub. No.: WO2022/064855
PCT Pub. Date: Mar. 31, 2022

(65) Prior Publication Data
US 2023/0411768 A1 Dec. 21, 2023

(30) Foreign Application Priority Data

Sep. 25, 2020 (JP) ................................. 2020-160757

(51) Int. Cl.
| | |
|---|---|
| *H01M 50/333* | (2021.01) |
| *H01M 50/213* | (2021.01) |
| *H01M 50/271* | (2021.01) |
| *H01M 50/30* | (2021.01) |

(52) U.S. Cl.
CPC ....... *H01M 50/333* (2021.01); *H01M 50/213* (2021.01); *H01M 50/271* (2021.01); *H01M 50/394* (2021.01)

(58) Field of Classification Search
CPC .................................................. H01M 50/271
See application file for complete search history.

(56) References Cited

U.S. PATENT DOCUMENTS

| | | | | |
|---|---|---|---|---|
| 2016/0274682 A1* | 9/2016 | Yebka | .................. | H01M 50/213 |
| 2017/0288186 A1* | 10/2017 | Kruger | ................ | H01M 50/271 |

FOREIGN PATENT DOCUMENTS

| | | |
|---|---|---|
| CN | 108735949 A | 11/2018 |
| JP | 2016-072182 | 5/2016 |
| JP | 2017-144925 | 8/2017 |
| JP | 6365191 B2 | 8/2018 |

(Continued)

OTHER PUBLICATIONS

CN107768577AandTransaltion (Year: 2018).*

(Continued)

*Primary Examiner* — Brian R Ohara
(74) *Attorney, Agent, or Firm* — Rimon P.C.

(57) ABSTRACT

Battery pack as an example of an exemplary embodiment includes: a plurality of batteries; and case including case body housing the plurality of batteries and case lid covering opening of case body. Case is configured such that when the internal pressure increases due to generation of gas, case body and case lid are relatively displaced in directions away from each other and a gas exhaust opening is formed in a state that a coupling between case body and case lid is maintained.

5 Claims, 6 Drawing Sheets

(56)         References Cited

FOREIGN PATENT DOCUMENTS

JP              6641189  B2      2/2020

OTHER PUBLICATIONS

The EPC Office Action dated Jun. 12, 2024 for the related European Patent Application No. 21871987.0.
International Search Report of PCT application No. PCT/JP2021/028694 dated Oct. 26, 2021.
The Indian OA dated Mar. 18, 2026 for the related Indian Patent Application No. 202347007779.

\* cited by examiner

BATTERY PACK

TECHNICAL FIELD

The present disclosure relates to a battery pack.

BACKGROUND ART

A plurality of non-aqueous electrolyte secondary batteries such as lithium ion batteries may be electrically connected and housed in a case to be used in a form of a battery pack. When an abnormality occurs in a battery in the battery pack, a large amount of high-temperature combustible gas may be generated from the battery. When the gas is not appropriately exhausted to the outside of the battery pack, the internal pressure of the battery pack may increase and thus may damage the battery pack case. In general, the battery pack case is required to have a sealed structure in order to prevent water and dust from entering the inside of the battery pack, but when an abnormality occurs in the battery and the internal pressure of the case increases, it is necessary to quickly exhaust gas to the outside. For example, PTL 1 proposes a gas exhaust mechanism including a exhausting duct and a cylinder.

CITATION LIST

Patent Literature

PTL 1: Unexamined Japanese Patent Publication No. 2017-144925

SUMMARY OF THE INVENTION

As described above, it is an important problem to exhaust gas safely and smoothly when an abnormality occurs in a battery and the internal pressure of the battery pack increases. The gas exhaust mechanism in the battery pack of PTL 1 has a complicated structure and requires a large number of dedicated components, and is particularly problematic in terms of downsizing, cost reduction, etc. of the battery pack.

An object of the present disclosure is to provide a battery pack including a gas exhaust mechanism capable of safely and smoothly exhausting gas while having a simple structure.

A battery pack according to the present disclosure includes: a plurality of batteries; and a case including a case body housing the plurality of batteries and a case lid covering an opening of the case body, wherein the case is configured such that when an internal pressure increases due to generation of gas, the case body and the case lid are relatively displaced in directions away from each other and a gas exhaust opening is formed in a state where a coupling between the case body and the case lid is maintained.

A battery pack according to the present disclosure can safely and smoothly exhaust gas when an abnormality occurs in a battery and the internal pressure of the battery pack increases, while having a simple structure.

DESCRIPTION OF EMBODIMENT

An exemplary embodiment of the present disclosure is described in detail below with reference to the drawings. In the following description, specific shapes, materials, directions, numerical values, etc. are examples shown to facilitate understanding of the present disclosure and may be changed as appropriate to suit uses, purposes, specifications, or other requirements. In addition, it is initially envisaged that the configuration elements of the exemplary embodiment and the modified example thereof described hereinafter are selectively combined.

First Exemplary Embodiment

Figure 1:
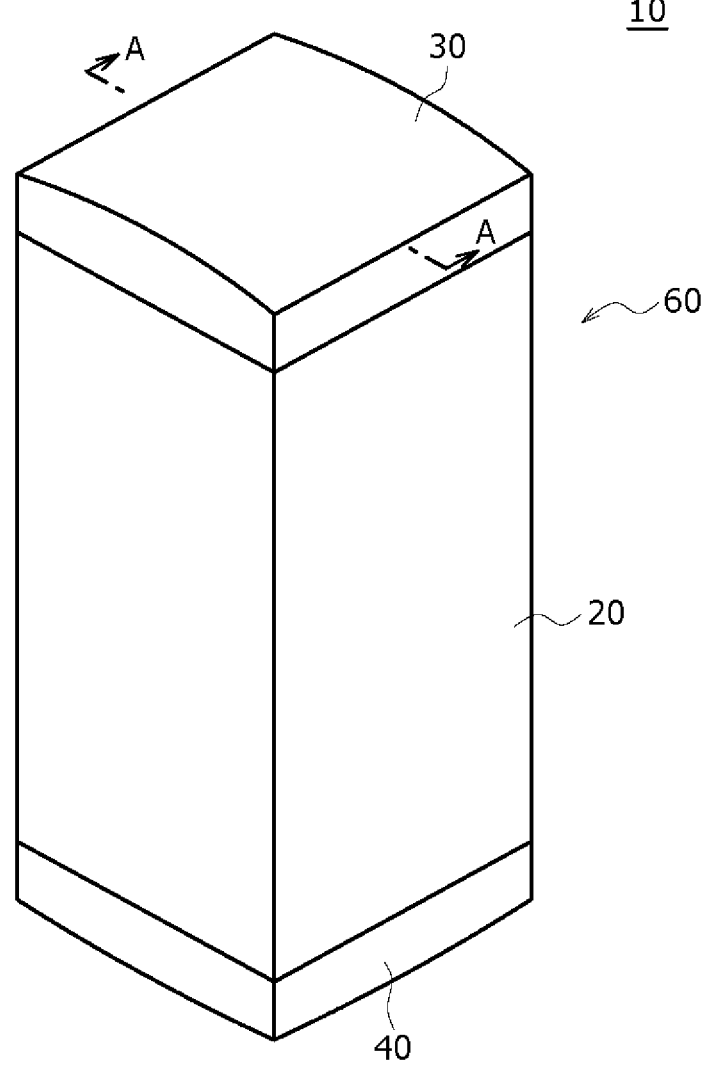
FIG. 1 is an external view of a battery pack according to one exemplary embodiment of the present disclosure.
Figure 2:
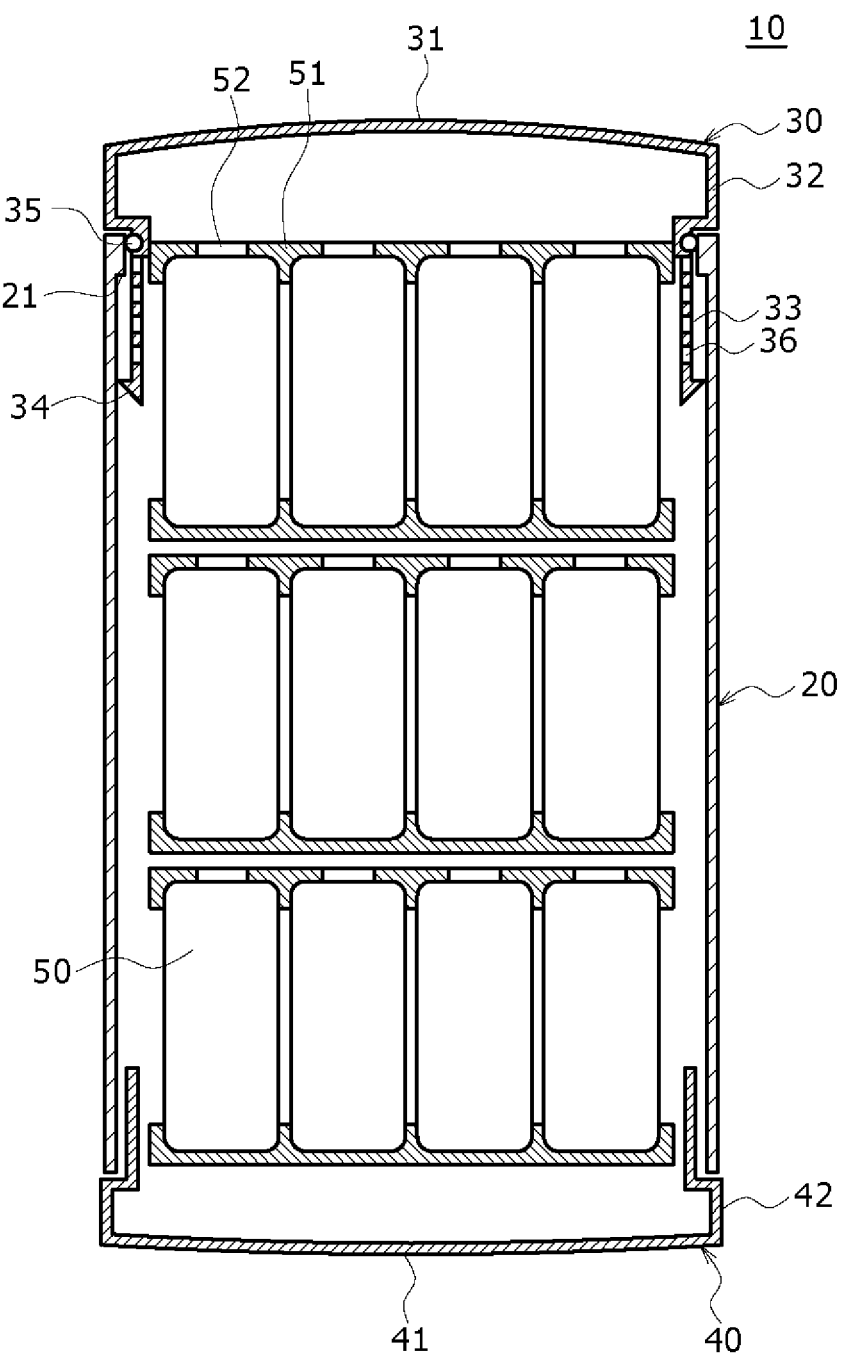
FIG. 2 is a cross-sectional view taken along line A-A in FIG. 1.

FIG. 1 is an external view of battery pack 10 according to the first exemplary embodiment of the present disclosure. FIG. 2 is a cross-sectional view taken along line A-A in FIG. 1. As shown in FIG. 1 and FIG. 2, battery pack 10 includes case 60 and a plurality of batteries 50. Case 60 includes case body 20 that houses the plurality of batteries 50 and case lid 30 that covers opening 22 (see FIG. 3) of case body 20. Case 60 has a structure in which each opening of case body 20 formed in a rectangular tube shape is closed by case lid 30 and case bottom 40, with the internal space sealed. Thus, water and dust are prevented from entering case 60. Hereinafter, for convenience of description, case lid 30 side of case 60 is referred to as an upper side, case bottom 40 side is referred to as a lower side, and a direction in which case lid 30, case body 20, and case bottom 40 are arranged is referred to as a vertical direction.

The plurality of batteries 50 is electrically connected to each other to constitute an assembled battery. The assembled battery has, for example, a structure in which a plurality of battery groups each including a plurality of batteries 50 connected in parallel is connected in series, and is configured to output a voltage suitable for a device to be used. Each battery 50 is, for example, a cylindrical battery. Although a cylindrical battery is illustrated as battery 50 in FIG. 2, the battery is not limited to the cylindrical battery and may be a prismatic battery, a laminate battery, etc. Further, battery 50 may be an aqueous battery or a non-aqueous battery. An example of the non-aqueous battery is a lithium ion battery.

Battery 50 is a cylindrical battery including a bottomed cylindrical outer covering can and a sealing body that covers an opening of the outer covering can. An insulating gasket is disposed between the outer covering can and the sealing body. In a cylindrical battery, generally, the sealing body serves as a positive-electrode terminal and the outer covering can serves as a negative-electrode terminal. The sealing body is provided with an exhaust valve for exhausting gas when an abnormality occurs in battery 50 and the internal pressure increases. The exhaust valve may be provided at the bottom of the outer covering can.

The plurality of batteries 50 is housed by holder 51 inside case 60. Holder 51 fixes the arrangement of batteries 50 and maintains the layout of the assembled battery. In addition, battery pack 10 includes, for example, a terminal plate that electrically connects the plurality of batteries 50. The terminal plate includes a positive electrode side terminal plate electrically connected to the sealing body, which is the positive-electrode terminal of each battery 50, and a negative electrode side terminal plate electrically connected to the outer covering can, which is the negative-electrode terminal of each battery 50. The terminal plate may be integrated with holder 51.

Holder 51 is configured to hold both upper and lower ends of each battery 50. In holder 51, for example, hole 52 is formed at a position facing the sealing body of each battery 50. Hole 52 exposes the sealing body of each battery 50 and allows gas to be smoothly exhausted from the sealing body (exhaust valve) when an abnormality occurs in battery 50. In the present exemplary embodiment, each battery 50 is arranged such that the sealing body faces case lid 30, and hole 52 is formed in holder 51 at a position overlapping the sealing body. Thus, when gas is exhausted from battery 50, case lid 30 is easily pushed upward.

Case 60 is provided with an external terminal (not shown) electrically connected to each battery 50. The external terminal is provided on case bottom for example, and is used as a terminal for supplying a direct current voltage when the external terminal is installed in a device where battery pack 10 is mounted and used. The external terminal is also used when battery pack 10 (battery 50) is charged.

Figure 3:
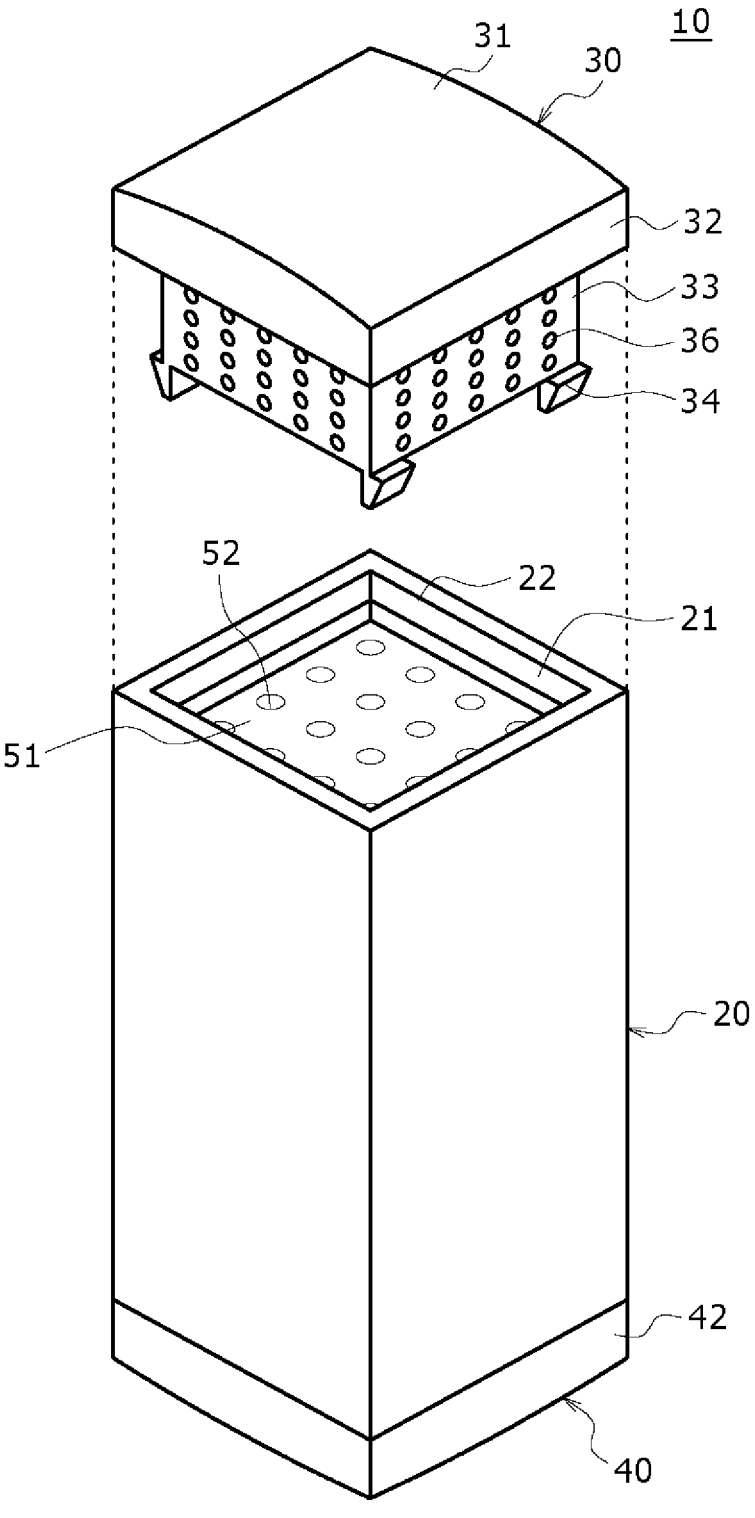
FIG. 3 is an exploded perspective view of the battery pack according to one exemplary embodiment of the present disclosure showing a state in which a case lid is removed.

Hereinafter, the configuration of case 60 is described in detail with further reference to FIG. 3. FIG. 3 is a view showing a state in which case lid 30 is removed from case body 20.

As shown in FIG. 1 to FIG. 3, case 60 constituting battery pack 10 includes case body 20, case lid 30, and case bottom 40, and is formed in a rectangular-parallelepiped shape elongated in the vertical direction. Case 60 may be made of resin or may be made of metal. As described above, case body 20 is formed in a rectangular tube shape with both upper and lower ends opened. Case 60 has a structure in which opening 22 on the upper end side of case body 20 is closed by case lid 30 and the opening on the lower end side of case body 20 is closed by case bottom 40. In the internal space of sealed case body 20, the plurality of batteries 50 is arranged in a state where the sealing bodies face case lid 30, but the number, arrangement, etc. of the batteries are not limited to the example illustrated in FIG. 2.

Case bottom 40 includes bottom plate 41 and lateral part 42 which is erected on a peripheral edge part of bottom plate 41, and forms a bottom part of case 60. Bottom plate 41 has, for example, a quadrangular shape in bottom view and is formed slightly larger than the opening on the lower end side of case body Lateral part 42 has a step at an intermediate part in the vertical direction, and is formed in a rectangular tube shape in which an upper part is smaller than a lower part. The upper part of lateral part 42 is inserted into case body 20 from the opening on the lower end side of case body 20 and is joined to case body 20. In the present exemplary embodiment, case body 20 and case bottom 40 are separate bodies, but the case body may be a bottomed cylindrical part with one axial end closed.

Figure 4:
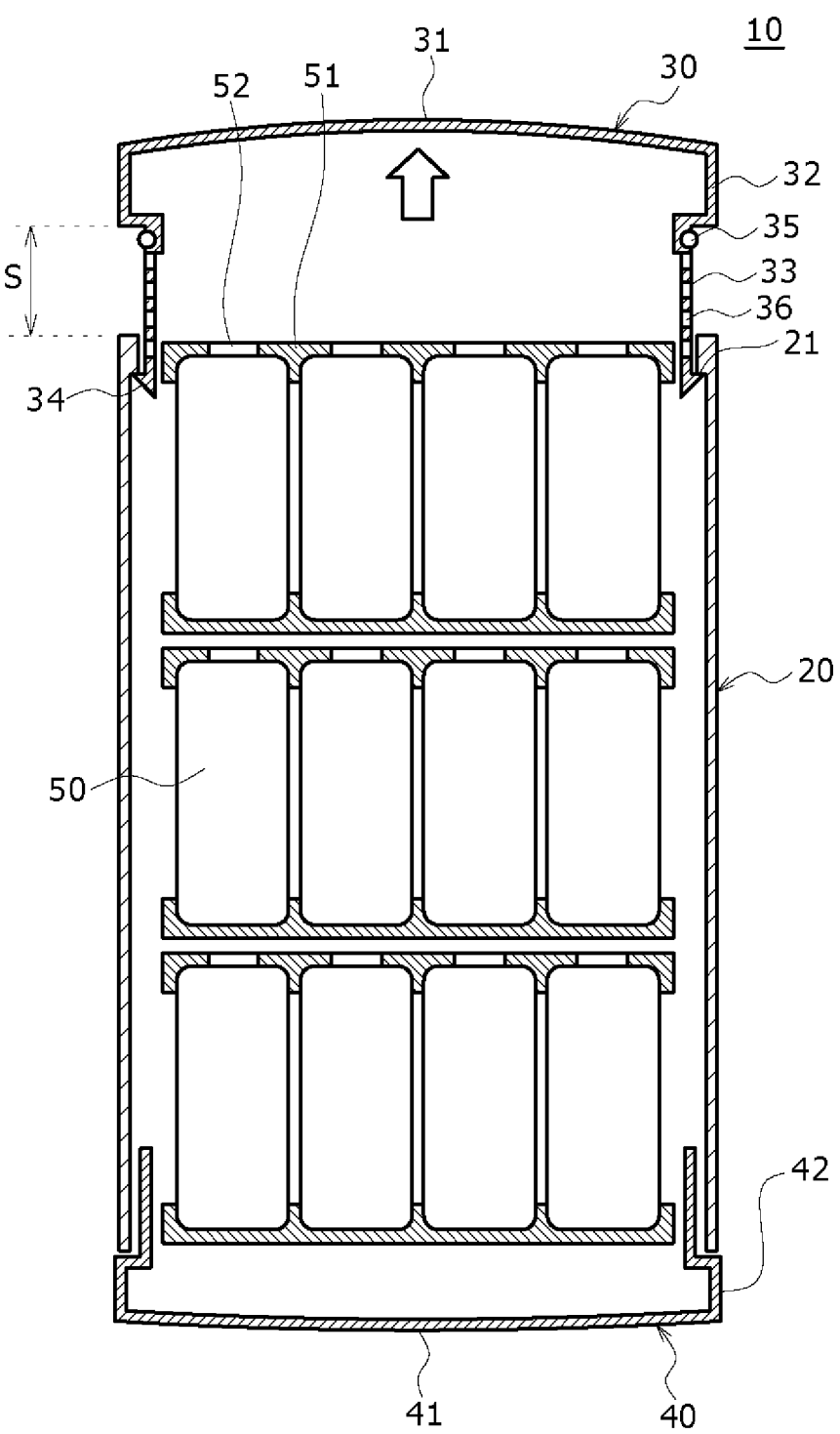
FIG. 4 is a cross-sectional view of the battery pack according to one exemplary embodiment of the present disclosure showing a state in which a gas exhaust mechanism is actuated.

Case 60 is configured such that when gas is exhausted from battery 50 and the internal pressure increases, case body 20 and case lid 30 are relatively displaced in directions away from each other and a gas exhaust opening is formed in a state where a coupling between case body 20 and case lid 30 is maintained. In the present exemplary embodiment, as shown in FIG. 4 to be described later, when the internal pressure of case 60 increases, case lid 30 is pushed upward, and an exhaust opening is formed at a boundary part between case body 20 and case lid 30. Since the exhaust opening is formed, gas can be smoothly exhausted to the outside of case 60, and damage to case 60 is prevented.

Case lid 30 includes top plate 31 and lateral part 32 which is erected on a peripheral edge part of top plate 31. Top plate 31 has, for example, a quadrangular shape in plan view and is formed slightly larger than opening 22 on the upper end side of case body 20. Lateral part 32 is formed in a rectangular tube shape, and the outer surface of lateral part 32 and the outer surface of case body 20 are flush with each other. Case lid 30 includes a slide part 33 inserted into case body 20. Slide part 33 is an extension part extending downward from a lower end of lateral part 32, and is formed inside of case 60 relative to lateral part 32.

Slide part 33 may be formed on a part of lateral part 32 in a circumferential direction. For example, two plate-shaped slide parts 33 may be formed in a manner of facing each other. In the present exemplary embodiment, slide part 33 is formed over the entire circumferential length of lateral part 32 in a manner of surrounding opening 22 of case body 20. That is, slide part 33 has a rectangular tube shape that is smaller than lateral part 32. Slide part 33 formed in the rectangular tube shape is formed to have a size that allows slide part 33 to be inserted into case body 20 from opening 22.

Tab 34 that engages with case body 20 is formed at a lower end of slide part 33. In the present exemplary embodiment, projection 21 is formed at an edge of opening 22 of case body 20, and tab 34 is engaged with projection 21, so that case lid 30 is not detached from case body 20. Tabs 34 are formed at both ends of each of two opposing slide surfaces among four slide surfaces of slide part 33 formed in the rectangular tube shape. As described in detail below, when the internal pressure of case 60 increases and case lid 30 is pushed upward, tab 34 is caught by projection 21, and thus, the coupling state between case body 20 and case lid 30 is maintained.

Sealing member 35 that abuts against an inner surface of case body 20 may be provided at a base of slide part 33. In the present exemplary embodiment, sealing member 35 is in close contact with projection 21 of case body 20 and closes a gap between case body 20 and sliding part 33 to improve the sealing property of the inside of case 60. A rubber packing such as an O-ring is used for sealing member 35, for example. The position of case lid 30 may be fixed by sealing member 35 which is compressed between case body 20 and slide part 33. Case lid 30 may be biased toward case body 20 by a biasing member, which is not shown.

Slide part 33 has a plurality of exhaust holes 36, and is exposed to the outside of case 60 when the internal pressure of case 60 increases and case lid is pushed upward, that is, when case body 20 and case lid 30 are relatively displaced in directions away from each other. In the present exemplary embodiment, exhaust hole 36 serves as the exhaust opening, and slide part 33 serves as a main configuration element of a gas exhaust mechanism.

As described in detail below, when the internal pressure of case 60 increases and case lid 30 is pushed upward, gap S (see FIG. 4) is formed between the upper end of case body 20 and the lower end of lateral part 32 of case lid 30. At this time, slide part 33 is exposed from gap S. In other words, slide part 33 is disposed so as to cover gap S. Since the plurality of exhaust holes 36 is formed in slide part 33, gas in case 60 is exhausted to the outside through exhaust holes 36.

Slide part 33 is formed in a rectangular tube shape having a quadrangular cross section, and the plurality of exhaust holes 36 is formed in each of the four side surfaces of slide part 33. For example, exhaust holes 36 are formed in the same number and the same size in each side surface. In this case, gas in case 60 is easily exhausted evenly around case 60. Note that exhaust holes 36 may be formed in one side surface of slide part 33, or may be formed in two opposite side surfaces of slide part 33. In addition, the number, size, etc. of exhaust holes 36 may be different for each side surface. In this case, gas can be preferentially exhausted in a specific direction outside case 60.

Exhaust holes 36 are formed in a wide range of each side surface of slide part 33. Exhaust holes 36 have, for example, a perfect circular shape, and are arranged in rows and columns at equal intervals. In slide part 33, although a small number of large exhaust holes 36 may be formed, it is preferable to form a large number of small exhaust holes 36 in order to exhaust gas safely and smoothly. In addition, from the viewpoint of control of gas exhaust, the plurality of exhaust holes 36 is preferably formed to be regularly arranged. As long as the arrangement is regular, the arrangement of exhaust holes 36 is not limited to an arrangement in which exhaust holes 36 are arranged in rows and columns, and may be a staggered arrangement, etc.

The size of exhaust hole 36 and the opening area of slide part 33 (the total area of exhaust holes 36) are determined so that the gas exhaust state is appropriate. The gas exhaust speed is determined by the internal pressure of case 60, the size of each exhaust hole 36, and the opening area of slide part 33. Since exhausted gas contains combustible components, it is necessary to prevent ignition when gas is exhausted from case 60. As a result of studies by the inventor of the present disclosure, it has been found that the gas exhaust speed is an important factor for suppressing ignition and the ignition suppressing effect is enhanced when the gas exhaust speed exceeds a predetermined threshold value. Therefore, it is preferable to set the size of each exhaust hole 36 and the opening area of slide part 33 so that the gas exhaust speed exceeds the threshold value.

Sliding part 33 may have a mesh structure. The mesh structure means a lattice-shaped or net-shaped structure having periodically arranged fine line-shaped partitions. The gaps between the fine line-shaped partitions serve as exhaust holes 36. For example, the width of the partition is set to be smaller than the width of exhaust hole 36, and the opening ratio of the mesh structure (the total area of exhaust holes 36) is set to be larger than 50%. The mesh structure is preferably made of metal.

When slide part 33 has the mesh structure, for example, it is easy to increase the opening area while reducing the size of each exhaust hole 36. Thus, gas is exhausted more smoothly and the exhaust speed is easily controlled. In addition, by forming slide part 33 in a mesh shape, it is possible to easily trap sparks while ensuring smooth gas exhaust performance. When sparks are efficiently trapped by the mesh structure, the ignition suppressing effect is further enhanced.

In the present exemplary embodiment, the opening area changes in accordance with the internal pressure of case 60. When the internal pressure of case 60 increases, case lid 30 is pushed upward, and the push-up amount of case lid 30 depends on the internal pressure. Since exhaust holes 36 are formed in a wide range of each side surface of slide part 33 which is exposed when case lid 30 is pushed upward, the push-up amount of case lid 30 changes, that is, the number of exhaust holes 36 which are exposed in accordance with the internal pressure changes, and thereby the opening area changes. Slide part 33 may be formed to be long within a range where interference with the internal structure of battery pack 10 is not a problem, and as slide part 33 becomes longer, it is easier to change the opening area in accordance with the internal pressure.

Case lid 30 may move downward by its own weight when gas is exhausted from case 60 and the internal pressure decreases, but is preferably biased toward case body 20 by a biasing member (not shown). That is, case lid 30 is biased in a direction to make case body 20 and case lid 30 approach each other. In this case, the movement of case lid 30 during normal use is more reliably suppressed. In addition, since the exhaust opening is closed after gas is exhausted, inflow of air into case 60 is suppressed, and combustion of battery 50 is more reliably suppressed.

The biasing member attached to case lid 30 is, for example, a tension spring, a rubber belt, etc. One end of the biasing member is fixed to case body 20, and the other end of the biasing member is fixed to case lid 30. The biasing member is preferably fixed inside case 60, but may also be fixed outside case 60.

FIG. 4 is a cross-sectional view showing a state in which the gas exhaust mechanism is actuated, that is, a state in which case lid 30 is pushed upward. As shown in FIG. 4, in battery pack 10, when gas is exhausted from battery 50 due to an abnormality of battery 50 and the internal pressure of case 60 increases, case lid 30 is pushed upward, and gap S is formed between the upper end of case body 20 and the lower end of lateral part 32 of case lid 30. At this time, slide part 33 slides along the inner surface of case body 20, moves upward so as to close gap S, and is exposed to the outside of case 60 from gap S. Since the plurality of exhaust holes 36 is formed in slide part 33, gas in case 60 is exhausted to the outside from exhaust holes 36. That is, when exhaust holes 36 are exposed, exhaust holes 36 function as gas exhaust openings.

According to battery pack 10, since gap S is formed at the boundary part between case body 20 and case lid 30 and exhaust holes 36 of slide part 33 are exposed, gas is smoothly exhausted to the outside of case 60, and damage to case is prevented. At this time, since tab 34 of slide part 33 is engaged with projection 21 of case body 20, case lid 30 is not detached from case body 20. That is, the gas exhaust opening is formed in a state where the coupling between case body 20 and case lid 30 is maintained.

When case lid 30 is biased toward case body 20, once the internal pressure reaches a predetermined value that overcomes a biasing force, case lid 30 is pushed upward against the biasing force, gap S is formed, and exhaust holes 36 of slide part 33 are exposed. Then, gas is exhausted from exhaust holes 36. When gas is exhausted and the internal pressure of case 60 decreases, case lid 30 is pulled toward case body 20 by the biasing force, and case lid 30 returns to an original position with no gap S. As a result, the internal space of case 60 is sealed again, and inflow of air is suppressed.

The moving distance of case lid 30 is long when the internal pressure is high, and is short when the internal pressure is low. When the moving distance of case lid 30 is long, the length of slide part 33 exposed to the outside of case 60 becomes long. Then, the number of exhaust holes 36 exposed to the outside of case body 20 increases, and therefore, the total area of exposed exhaust holes 36 increases. That is, as the internal pressure becomes higher, the total area of exhaust holes 36 exposed to the outside of case body 20 becomes larger, and it is thus possible to quickly exhaust gas with increased pressure. Even when the internal pressure is high, if tab 34 is provided on slide part 33, tab 34 is caught by projection 21 to restrict the movement of case lid 30, and it is thus possible to prevent case lid 30 from being completely detached from case body 20.

The opening area of the gas exhaust mechanism of battery pack 10 changes in accordance with the internal pressure, and the gas exhaust mechanism can exhibit exhaust capacity in accordance with the internal pressure. Battery pack 10 has a simple structure, in which case lid 30 is only provided with slide part 33 that engages with case body 20, and thus battery pack 10 allows the realization of a gas exhaust mechanism which does not require a dedicated additional component and can be downsized.

Second Exemplary Embodiment

Figure 5:
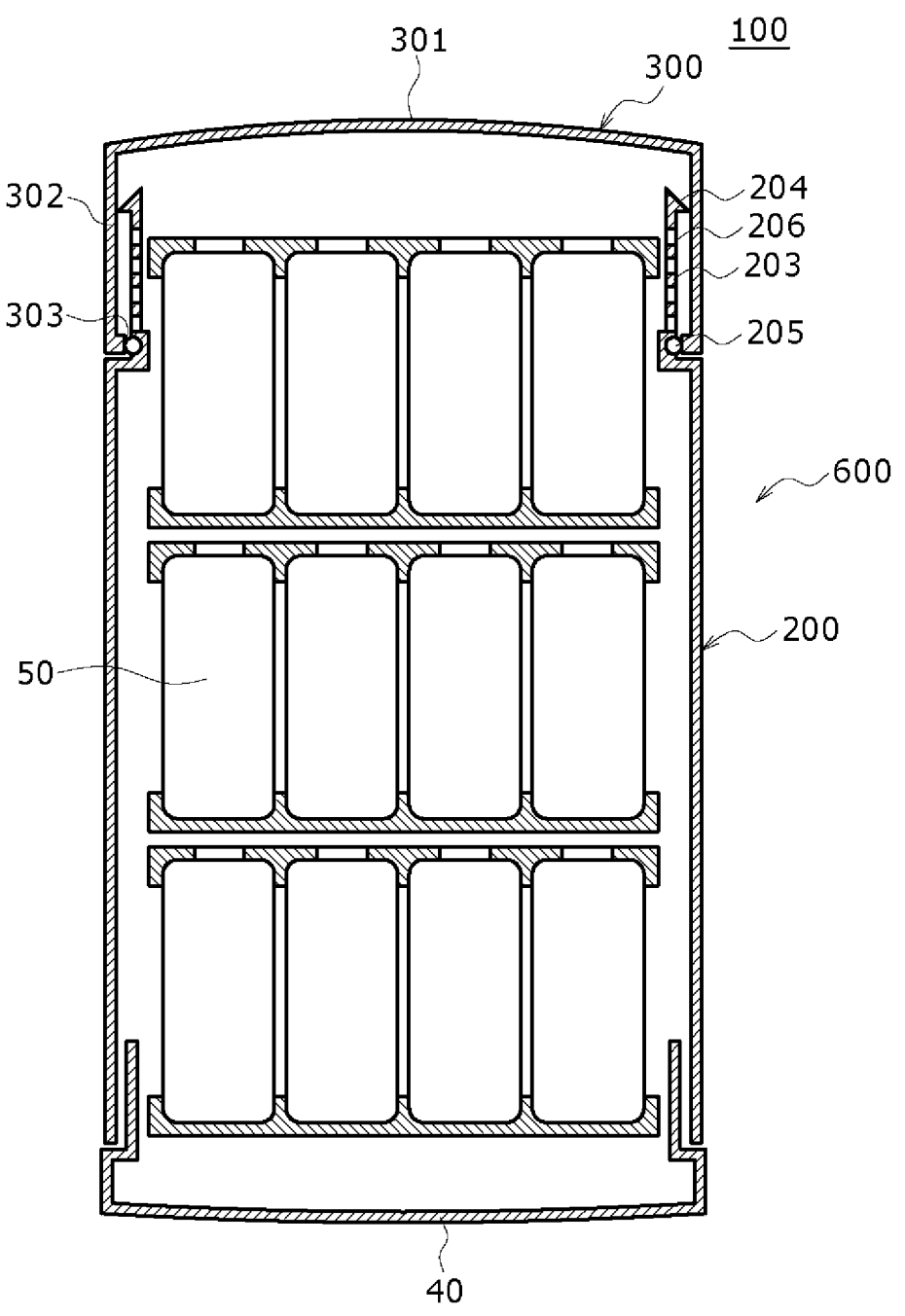
FIG. 5 is a cross-sectional view of a battery pack according to another exemplary embodiment of the present disclosure.
Figure 6:
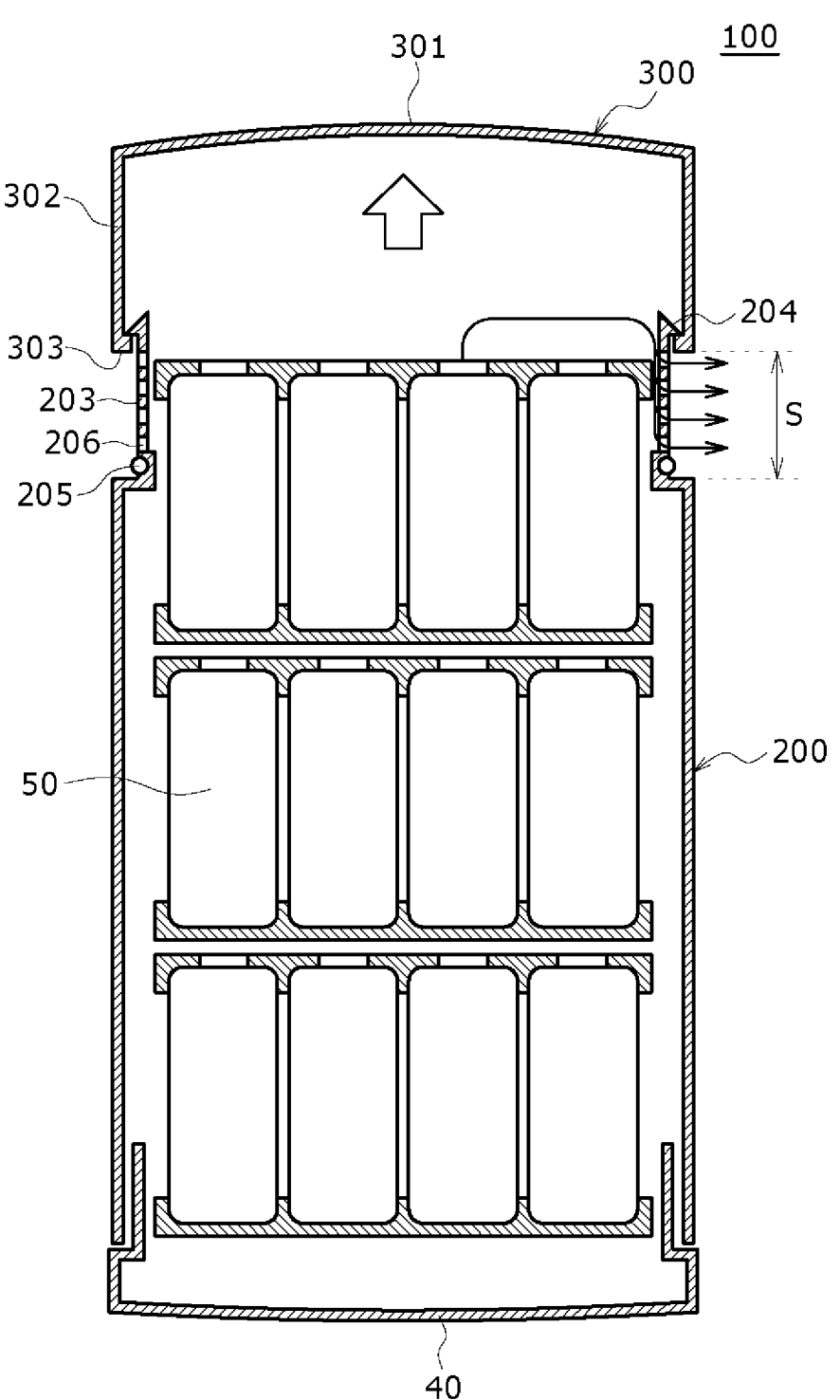
FIG. 6 is a cross-sectional view of the battery pack according to the another exemplary embodiment of the present disclosure showing a state in which a gas exhaust mechanism is actuated.

Hereinafter, battery pack 100 according to the second exemplary embodiment of the present disclosure is described with reference to FIG. 5 and FIG. 6. FIG. 5 and FIG. 6 are cross-sectional views of battery pack 100, and FIG. 6 shows a state in which case lid 300 is pushed upward. In the description hereafter, configuration elements similar to those in the first exemplary embodiment are denoted by the same reference marks, and redundant descriptions thereof are omitted.

As shown in FIG. 5, battery pack 100 is different from battery pack 10 of the first exemplary embodiment in that battery pack 100 includes case 600 in which slide part 203 having a plurality of exhaust holes 206 is formed on case body 200. Similar to case 60 of battery pack 10, case 600 includes case lid 300, which covers the opening of case body 200, and case bottom 40, but on case lid 300, projection 303 with which slide part 203 engages is formed, and no slide part is formed. Case lid 300 has top plate 301 and lateral part 302 which is erected on a peripheral edge part of top plate 301, and projection 303 on which tab 204 of slide part 203 is caught is formed at a lower end of lateral part 302 formed in a rectangular tube shape.

A plurality of batteries 50 is housed inside case 600 in the same arrangement as in battery pack 10. Slide part 203 formed on case body 200 is formed in a rectangular tube shape having a size that allows slide part 203 to be inserted into case lid 300, and a plurality of exhaust holes 206 is regularly formed in each side surface of slide part 203. At a base of sliding part 203, sealing member 205 is provided for closing a gap between case body 200 and case lid 300 to improve the sealing property of case 600. Slide part 203 has a structure similar to that of slide part 33 of battery pack 10, except that slide part 203 extends upward from the upper end of case body 200.

Similar to case 60, case 600 is configured such that when the internal pressure increases due to generation of gas, case body 200 and case lid 300 are relatively displaced in directions away from each other, and slide part 203 is exposed to the outside of case 600. Thus, in a state where a coupling between case body 200 and case lid 300 is maintained, a gas exhaust opening is formed. Also in this case, exhaust hole 206 serves as the gas exhaust opening. The configuration of battery pack 10 described above can be selectively applied to battery pack 100.

As shown in FIG. 6, similarly in battery pack 100, when the internal pressure of case 600 increases, case lid 300 is pushed upward, and gap S is formed between the upper end of case body 200 and the lower end of lateral part 302 of case lid 300. Thus, slide part 203 provided on case body 200 is exposed to the outside of case 60 from gap S. Since the plurality of exhaust holes 206 is formed in slide part 203, gas in case 600 is exhausted to the outside from exhaust holes 206.

At this time, since tab 204 of slide part 203 is engaged with projection 303 of case lid 300, case lid 300 is not detached from case body 200. In particular, when case lid 300 is biased toward case body 200, it is easy to change the opening area in accordance with the internal pressure, and it is possible to control the exhaust amount of gas so that the gas exhaust speed exceeds the above-described threshold value. According to battery pack 100, similar to battery pack 10, it is possible to exhaust gas safely and smoothly.

Although exemplary embodiments of the present disclosure have been described above, these are merely examples, and configurations other than those described above are not excluded. For example, although the appearance of the battery pack is a rectangular parallelepiped in the above-described exemplary embodiment, the appearance is not limited thereto and may be a cylindrical shape, and other shapes are not excluded. Although each side surface of the rectangular parallelepiped has substantially the same shape, adjacent surfaces may have different sizes and shapes. The dimensional ratio between the case lid and the case body is not limited to that disclosed in the drawings. In addition, when the battery pack is actually used, the shape of the battery pack may be provided with a projection or recess, a handle, a terminal, etc. on the periphery, but those are provided in a range in which the operation of the exhaust mechanism described in the present disclosure is not affected, and do not affect the action of the exhaust mechanism of the present exemplary embodiment.

In the above-described exemplary embodiment, the engagement parts (tabs) with the case body are formed on two opposing side surfaces of the extension part constituting the gas exhaust mechanism, but the engagement parts are not limited to the two opposing side surfaces and may be formed on all the side surfaces. In addition, although the engagement parts are formed at both ends of one side of the extension part, the engagement parts may be formed only at a part of a central part of one side or may be formed over the entire length of one side.

Further, the case may be divided into left and right parts instead of being divided into upper and lower parts. By providing the exhaust mechanism as shown in the exemplary embodiment of the present disclosure as a case part, it is possible to maintain the sealed state of the battery pack and to operate the gas exhaust mechanism when gas is generated and the internal pressure increases.

The battery pack according to the present disclosure can be used as a power supply component for an electronic device. Examples include a battery pack for a laptop computer, a battery pack for a cleaner, and a battery pack for a power tool, etc. The present disclosure can also be applied to a battery for an electrically assisted bicycle. The present disclosure can be applied to a use other than those listed here as long as the use is an application of battery pack.

REFERENCE MARKS IN THE DRAWINGS

10, 100: battery pack
20, 200: case body

21, 303: protrusion
22: opening
30, 300: case lid
31, 301: top plate
32, 302: lateral part
33, 203: slide part
34, 204: tab
35, 205: sealing member
36, 206: exhaust hole
40: case bottom
41: bottom plate
42: lateral part
50: battery
51: holder
52: hole
60, 600: case

The invention claimed is:

1. A battery pack, comprising:

a plurality of batteries; and a case including a case body that houses the plurality of batteries and a case lid that closes an opening of the case body, wherein the case is configured to satisfy that when an internal pressure in the case increases due to generation of gas, the case body and the case lid are relatively displaced in directions away from each other, and a gas exhaust opening is formed in a state that a coupling between the case body and the case lid is maintained, one of the case body or the case lid includes an extension portion to be inserted into an other one of the case body or the case lid, and the extension part includes a plurality of exhaust holes, and is exposed to an outside of the case when the case body and the case lid are relatively displaced in directions away from each other.

2. The battery pack according to claim 1, wherein the extension part includes a mesh structure.

3. The battery pack according to claim 1, wherein the case includes a structure of biasing the case lid in a direction which the case body and the case lid approach each other.

4. A battery pack, comprising:

a plurality of batteries; and a case including a case body that houses the plurality of batteries and a case lid that closes an opening of the case body, wherein the case is configured to satisfy that when an internal pressure in the case increases due to generation of gas, the case body and the case lid are relatively displaced in directions away from each other, and a gas exhaust opening is formed in a state that a coupling between the case body and the case lid is maintained, one of the case body or the case lid includes an extension portion to be inserted into an other one of the case body or the case lid, and the extension part includes a mesh structure.

5. The battery pack according to claim 4, wherein the case includes a structure of biasing the case lid in a direction which the case body and the case lid approach each other.

* * * * *